US00RE40386E

(19) United States
(12) Reissued Patent
Kobayashi et al.

(10) Patent Number: US RE40,386 E
(45) Date of Reissued Patent: Jun. 17, 2008

(54) CHROME PLATED PARTS AND CHROME PLATING METHOD

(75) Inventors: Yuichi Kobayashi, Sagamihara (JP); Junichi Nagasawa, Kamakura (JP); Shoichi Kamiya, Toyokawa (JP); Toshiyuki Fukaya, Nukata-gun (JP); Hiromi Hieno, Gamagori (JP); Kazuo Watanabe, Fuchu (JP)

(73) Assignee: Hitachi Ltd., Tokyo (JP)

(21) Appl. No.: 10/401,613

(22) Filed: Mar. 31, 2003

Related U.S. Patent Documents

Reissue of:
(64) Patent No.: 6,329,071
Issued: Dec. 11, 2001
Appl. No.: 09/431,321
Filed: Nov. 2, 1999

(30) Foreign Application Priority Data

Nov. 6, 1998 (JP) ..... 10-332047
Oct. 6, 1999 (JP) ..... 11-285503

(51) Int. Cl.
*B32B 15/01* (2006.01)
*C25D 5/14* (2006.01)
*C25D 5/18* (2006.01)
*C25D 3/04* (2006.01)
*C25D 3/10* (2006.01)

(52) U.S. Cl. ..... 428/615; 205/104; 205/170; 205/179; 205/283; 205/290

(58) Field of Classification Search ..... 148/121, 148/123; 205/104, 170, 179, 222, 224, 283, 205/290; 428/615
See application file for complete search history.

(56) References Cited

U.S. PATENT DOCUMENTS 3,318,786 A * 5/1967 Faust et al. ..... 205/104
3,616,349 A * 10/1971 Szupillo ..... 205/657
3,661,733 A * 5/1972 Roggendorf ..... 205/286

(Continued)

FOREIGN PATENT DOCUMENTS

| | | |
|---|---|---|
| DE | 3933896 | 10/1989 |
| GB | 2 236 763 | 4/1991 |
| GB | 2236763 | 4/1991 |

(Continued)

OTHER PUBLICATIONS

Kohl et al.; UK Pat. App. 2 236 763 A; Apr. 1991; IDS; claims.*

Lausmann et al., "Die galvanische Verchromung"; Leuze–Verlag, Saulgau; 1st edition 1998; chapter 2.6.4.2 (pp. 136–152), and chapter 7.4.6 (pp. 347–352).*

Federal Specification QQ–C–320a (Jul. 25, 1967) in Military Specification and Standards (rustproof version).*

(Continued)

*Primary Examiner*—Michael J. Feely
(74) *Attorney, Agent, or Firm*—Oblon, Spivak, McClelland, Maier & Neustadt, P.C.

(57) ABSTRACT

Using a chrome plating bath containing organic sulfonic acid, plating is conducted by application of a pulse current to thereby form a crack-free lower chrome layer on a steel substrate. The lower chrome layer has a compressive residual stress of 100 MPa or more and a crystal grain size of from 9 nm to less than 16 nm. Subsequently, by application of a direct current, a cracked upper chrome layer is formed on the lower chrome layer, to thereby obtain a chrome plated part. The lower chrome layer imparts the chrome plated part with heat resistance and corrosion resistance, and the upper chrome layer imparts the chrome plated part with wear resistance and good sliding properties.

26 Claims, 6 Drawing Sheets

U.S. PATENT DOCUMENTS

| | | | | | |
|---|---|---|---|---|---|
| 3,886,053 | A | * | 5/1975 | Leland | 205/93 |
| 3,985,916 | A | * | 10/1976 | Church et al. | 427/543 |
| 4,804,446 | A | * | 2/1989 | Lashmore et al. | 205/104 |
| 4,869,971 | A | * | 9/1989 | Nee et al. | 428/635 |
| 5,837,354 | A | * | 11/1998 | Ogisu et al. | 428/208 |
| 6,106,351 | A | * | 8/2000 | Raina et al. | 445/24 |
| 6,329,071 | B1 | | 12/2001 | Kobayashi et al. | |

FOREIGN PATENT DOCUMENTS

| | | | |
|---|---|---|---|
| JP | 43-020082 | * | 8/1968 |
| JP | 61-235593 | * | 10/1986 |
| JP | 3-6393 | | 1/1991 |
| JP | 3-207884 | | 9/1991 |
| JP | 4-350193 | | 12/1992 |
| JP | 04-350193 | * | 12/1992 |
| JP | 10-156490 | * | 6/1998 |
| JP | 11-210865 | | 8/1999 |
| JP | 2000-199095 A | | 7/2000 |
| KR | 96-705966 | * | 11/1996 |
| WO | WO 89/07162 | | 8/1989 |
| WO | WO 95/141121 | * | 5/1995 |

OTHER PUBLICATIONS

"Hihakai Kensa (non–destructive inspection)", vol. 37, item 8, pp. 636–642, edited by the Japanese Society for Non–destructive Inspection (no date).*

Machine translation of JP 10–156490, provided by the JPO website (1998).*

Makoto Kuramoto, et al., "Stress Measurement in Electrodeposited Chromium", The Japanese Society for Non–Destructive Inspection, vol. 37, No. 8 (pp. 1–16) (no date).

Official Action of the German Patent and Trademark Office (Dec. 17, 2002) w/English Translation.

G.A. Lausmann, et al., "Chromium Electroplating", Electroplating and Surface Treatment Textbook Series, First Edition, 1998, pp. 146–152 and 347–352.

Surface Treatment Technology Compendium, edited by the Surface Treatment Technology Association, published by The Nikkan Kogyo Shimbun, Ltd., Feb. 27, 1998, First Edition, p. 218 w/English translation.

* cited by examiner

CHROME PLATED PARTS AND CHROME PLATING METHOD

Matter enclosed in heavy brackets [ ] appears in the original patent but forms no part of this reissue specification; matter printed in italics indicates the additions made by reissue.

BACKGROUND OF THE INVENTION

The present invention relates to chrome plated parts comprising substrates having industrial chrome plating applied on the surfaces thereof. The present invention also relates to a chrome plating method and a production method for obtaining such parts.

Chrome plating, especially hard chrome plating, provides a hard metallic coating (i.e., a chrome layer) having a low coefficient of friction. Therefore, chrome plating has been widely used as industrial chrome plating for parts which are required to have high wear resistance.

With respect to general-purpose hard chrome plating, a chrome layer formed on a metallic substrate contains many cracks reaching the substrate, called channel cracks. Such a chrome layer enables a corrosive material to migrate into the metallic substrate and cause corrosion. This leads to formation of red rust when the substrate is made of steel.

In producing chrome plated parts, generally, a plated substrate is subjected to polishing, such as buffing, so as to provide a smooth surface. It is known that during polishing, cracks in a chrome layer become clogged due to the occurrence of plastic flow over the surface of the chrome layer. Therefore, in producing general-purpose chrome plated parts, after polishing, no special measures have been taken to prevent rusting.

However, when a chrome layer is subject to thermal hysteresis, contraction of the chrome layer occurs. In this case, cracks which have been clogged due to plastic flow in the chrome layer are caused to open. Consequently, parts which are used at temperatures higher than room temperature (for example, at 120° C. for 100 hours or more) are likely to suffer a lowering in corrosion resistance.

As a countermeasure, it has been attempted to conduct nickel plating or copper plating as a pretreatment, to thereby form a lower layer having a thickness almost equal to that of a chrome layer to be formed, and conducting hard chrome plating on the lower layer. However, in this countermeasure, a plating process must be conducted in two steps, leading to low productivity and high process costs.

As another countermeasure, it has been proposed to conduct chrome plating by using two different plating baths, to thereby deposit two chrome layers having different crystal orientations, thus preventing the formation of cracks reaching the substrate [reference is made to, for example, Unexamined Japanese Patent Application Public Disclosure (Kokai) No. 4-350193]. However, this countermeasure also requires a two-step plating process.

Further, there is a method of conducting electro-plating with a pulse current, so-called pulse plating, so as to obtain a crack-free chrome layer [reference is made to, for example, Unexamined Japanese Patent Application Public Disclosure (Kokai) No. 3-207884]. However, the chrome layer formed simply by pulse plating is subject to tensile residual stress. This leads to the formation of large cracks in the chrome layer due to the application of heat.

Further, there is a method of conducting pulse plating in a Sargent bath by application of an irregular pulse current, to thereby obtain a crack-free decorative chrome layer [reference is made to, for example, Examined Japanese Patent Application Publication (Kokoku) No. 43-20082]. The chrome layer obtained by this method has low (or no) stress. However, the obtained chrome layer has a stress gradient (as the thickness of the chrome layer becomes large, the value of stress shifts from a side of compressive stress toward a side of tensile stress). Therefore, average compressive stress in the chrome layer is undesirably low. Consequently, when the above-mentioned chrome layer is used as a lower layer and a cracked chrome layer is formed as an upper layer by plating on the lower chrome layer, the lower chrome layer is subject to tensile stress from the upper chrome layer, so that propagation of cracks through the upper chrome layer to the lower chrome layer occurs. Further, in the chrome plating bath in Kokoku No. 43-20082, average compressive residual stress can be increased only to a level as low as 100 MPa, even by controlling the waveform of an applied pulse current, a bath temperature and a current density.

In view of the above, the present invention has been made. It is an object of the present invention to provide chrome plated parts which maintain excellent corrosion resistance even when the chrome plated parts are subject to thermal hysteresis. It is another object of the present invention to provide a chrome plating method and a production method for efficiently obtaining such chrome plated parts.

SUMMARY OF THE INVENTION

According to the present invention, there is provided a chrome plated part comprising a substrate having a crack-free chrome layer applied on a surface thereof. The crack-free chrome layer has compressive residual stress and is formed by plating.

In the chrome plated part of the present invention in which a crack-free chrome layer having compressive residual stress is formed on a surface of the substrate, due to the compressive residual stress in the chrome layer, no formation of cracks in the chrome layer occurs. Therefore, the chrome layer maintains a crack-free structure. Consequently, the chrome plated part maintains excellent corrosion resistance even when it is subject to thermal hysteresis.

When compressive residual stress in the chrome layer is too low, the compressive residual stress changes to tensile residual stress due to the occurrence of thermal hysteresis. This leads to the formation of cracks in the chrome layer. Therefore, it is preferable for the compressive residual stress in the crack-free chrome layer to be 100 MPa or more.

Generally, when a chrome layer is subject to thermal hysteresis, the formation of cracks is likely to occur due to contraction of the chrome layer. This contraction is affected by the amount of lattice defects present in crystal grain boundaries in the chrome layer. Therefore, contraction of the chrome layer due to thermal hysteresis can be suppressed by suppressing the amount of lattice defects, that is, by increasing a crystal grain size and decreasing the length of a crystal grain boundary (the length of a crystal grain boundary is in inverse proportion to a crystal grain size). Therefore, in the chrome plated part of the present invention, it is preferred that the crystal grain size of the crack-free chrome layer be 9 nm or more.

The crystal grain size of a chrome layer formed by general-purpose hard chrome plating is as small as about 6 nm. The above-mentioned crystal grain size of the chrome layer in the present invention is much larger than this size. Therefore, the chrome layer in the present invention contains no cracks even prior to polishing, and maintains a crack-free structure even when it is subject to thermal hysteresis. Therefore, the chrome plated part has desired corrosion resistance. When the crystal grain size is too large, a crystal structure of the chrome layer changes. Therefore, it is preferable for the crystal grain size of the crack-free chrome layer to be less than 16 nm.

In the chrome plated part of the present invention, the crack-free chrome layer may be a lower chrome layer and the chrome plated part may further comprise a cracked upper chrome layer which is formed or applied on the lower chrome layer by plating. In this case, the hardness of the upper chrome layer can be increased to a maximum level. This improves wear resistance of the chrome plated part. Further, cracks in the upper chrome layer serve as oil sumps for holding lubricating oil, leading to suppression of sliding resistance.

The chrome plated part may further comprise at least one intermediate chrome layer which is formed between the lower chrome layer and the upper chrome layer by plating. When an intermediate chrome layer is provided, direct propagation of cracks through the upper chrome layer to the lower chrome layer can be suppressed. Therefore, corrosion resistance of the chrome plated part can be stably maintained.

The chrome plated part may further comprise an oxide film containing $Cr_2O_3$ as an outermost layer thereof. In this case, the chrome layer itself has high corrosion resistance, so that formation of white rust can be prevented.

The present invention also provides a chrome plating method comprising the step of conducting electroplating of a work in a chrome plating bath by application of a pulse current, the chrome plating bath containing organic sulfonic acid, to thereby deposit a crack-free chrome layer on a surface of the work. The crack-free chrome layer has compressive residual stress.

In the chrome plating method of the present invention, by adjusting a pulse waveform of an applied current which alternates between a maximum current density and a minimum current density, the compressive residual stress and crystal grain size of a chrome layer can be easily controlled. Therefore, it is possible to obtain a chrome layer having a compressive residual stress of 100 MPa or more and a crystal grain size of from 9 nm to less than 16 nm.

In the chrome plating method of the present invention, the above-mentioned chrome layer may be formed as a lower chrome layer and the above-mentioned upper chrome layer or the above-mentioned intermediate and upper chrome layers may be formed on the lower chrome layer. In this case, after the chrome layer is deposited as a lower chrome layer by using the pulse plating, electroplating of the work is conducted in the same chrome plating bath as the chrome plating bath for the pulse plating, by one of adjustment of a waveform of the pulse current and application of a direct current, to thereby deposit the upper chrome layer or intermediate chrome layer efficiently.

The chrome layers may be deposited by continuous operation by continuously moving the work in the chrome plating bath or may be deposited by batchwise operation by immersing the work in the chrome plating bath.

Further, the present invention provides a method for producing a chrome plated part, comprising the steps of: conducting the above-mentioned chrome plating method for the two or more than three layers; polishing the upper surface of the work; and conducting heat oxidation, to thereby form an oxide film containing $Cr_2O_3$ on a surface of the chrome layer.

When the upper chrome layer containing cracks is formed by the chrome plating method of the present invention, the cracks in the upper chrome layer become clogged during polishing due to the above-mentioned plastic flow in the chrome layer. Although the cracks are caused to open again due to heat oxidation after polishing, the chrome plated part has sufficient corrosion resistance for preventing formation of red rust, because the crack-free lower chrome layer is present on the substrate. In addition, since an oxide film containing $Cr_2O_3$ is present as the outermost layer of the chrome plated part, corrosion of the chrome layer itself can be suppressed, thus preventing formation of white rust.

In the method of the present invention for producing a chrome plated part, the method of heat oxidation is not particularly limited. For example, heat oxidation can be conducted under the same conditions as conditions of a general-purpose baking process or by high-frequency heating. With respect to the general-purpose baking process, Federal Specification QQ-C-320a(1967. 7. 25) requires that when steel having a hardness of HRC 40 or more is used as a substrate, the baking process be conducted at 191±14° C. for 3 hours or more. By conducting heat oxidation under the above-mentioned conditions, an oxide film containing $Cr_2O_3$ is formed on a surface of a substrate. As a method of heat oxidation by high-frequency heating, for example, a substrate is held at a temperature as high as about 400° C. for a short period of time of from several seconds to several tens of seconds.

The foregoing and other objects, features and advantages of the present invention will be apparent from the following detailed description and appended claims taken in connection with the accompanying drawings.

DETAILED DESCRIPTION OF THE INVENTION

Hereinbelow, embodiments of the present invention are explained, with reference to the drawings.

Figure 1:
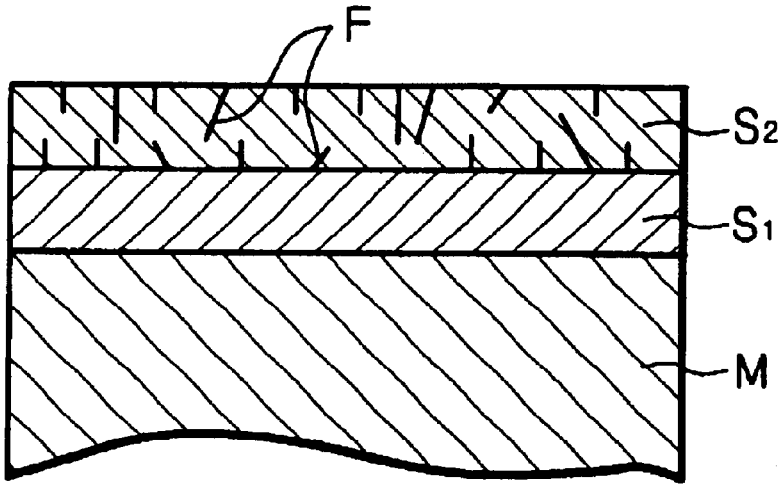
FIG. 1 is a schematic illustration of cross section showing a surface structure of a chrome plated part according to a first embodiment of the present invention.

FIG. 1 shows a chrome plated part according to a first embodiment of the present invention. The chrome plated part comprises: a steel substrate M; a crack-free lower chrome layer $S_1$ formed by plating on a surface of the substrate M; and a multicracked upper chrome layer $S_2$ formed by plating on the lower chrome layer $S_1$. The cracks in the chrome layer $S_2$ are designated by a reference character F. The lower chrome layer $S_1$ has a compressive residual stress of 100 MPa or more and has a crystal grain size of from 9 nm to less than 16 nm. The upper chrome layer $S_2$ has a compressive residual stress less than 100 MPa or a tensile residual stress and has a crystal grain size less than 9 nm.

In the above-mentioned chrome plated part, the crack-free lower chrome layer $S_1$ is present below the upper chrome layer $S_2$. Therefore, although the cracks F are present in the upper chrome layer $S_2$, a corrosive material does not migrate into the substrate M, so that a desired corrosive resistance of the chrome plated part can be ensured. Further, the lower chrome layer $S_1$ has a predetermined compressive residual stress and a predetermined crystal grain size, so that the lower chrome layer $S_1$ maintains a crack-free structure even when it is subject to thermal hysteresis, to thereby ensure excellent corrosion resistance of the chrome plated part. In addition, since the upper chrome layer $S_2$ may contain cracks such as the cracks F, the hardness of the upper chrome layer $S_2$ can be increased to a sufficiently high level (900 HV or more), to thereby impart the chrome plated part with sufficient wear resistance. Further, the cracks F present in the upper chrome layer $S_2$ serve as oil sumps for holding lubricating oil, which enhances sliding properties of the chrome plated part.

Figure 2:
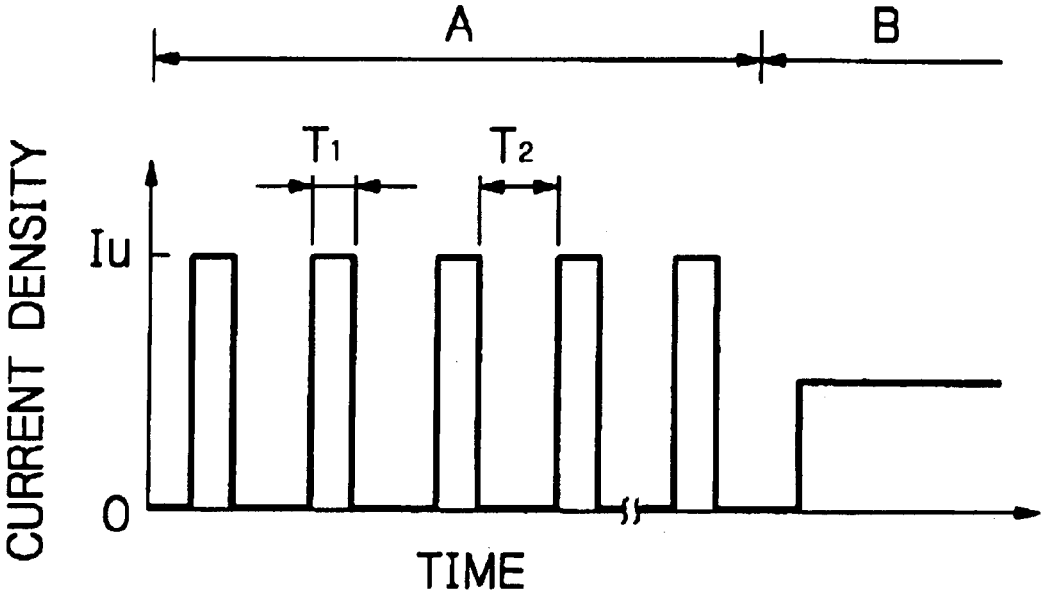
FIG. 2 is a graph showing an example of a waveform of a pulse current in a chrome plating process for obtaining the chrome plated part of FIG. 1.

The chrome layers $S_1$ and $S_2$ are formed by a two-step plating process in a chrome plating bath containing organic sulfonic acid. The two-step plating process comprises plating utilizing a pulse current (hereinafter, frequently referred to as "pulse plating") and plating utilizing a direct current (hereinafter, frequently referred to as "general-purpose plating"). An example of a current density pattern of an applied current for this process is shown in FIG. 2.

As the chrome plating bath containing organic sulfonic acid, it is preferred to use a chrome plating path described in Examined Japanese Patent Application Publication (Kokoku) No. 63-32874, which has compositions as shown in Table 1.

TABLE 1

| Component | Amount (g/L) Suitable | Preferable |
|---|---|---|
| Chromic acid | 100-450 | 200-300 |
| Sulfuric acid | 1-5 | 1.5-3.5 |
| Organic sulfonic acid | 1-18 | 1.5-12 |
| Boric acid | 0-40 | 4-30 |

Referring to FIG. 2, a zone A indicates a region for the pulse plating for forming the chrome layer $S_1$ and a zone B indicates a region for the general-purpose plating for forming the upper chrome layer $S_2$. In the zone A, the applied current alternates between two current densities, namely, a maximum current density $I_U$ and a minimum current density $I_L$. The maximum current density $I_U$ is held for a predetermined time period $T_1$ and the minimum current density $I_L$ is held for a predetermined time period $T_2$. In the example of FIG. 2, the minimum current density $I_L$ is set to zero (off). However, needless to say, the minimum current density $I_L$ may be arbitrarily set to a value between the maximum current density $I_U$ and zero. Further, the values of the time periods $T_1$ and $T_2$ may be set as being the same or different. In the first embodiment, for pulse plating, the maximum current density $I_U$, the minimum current density $I_L$ ($I_L$=0 in this example), the time period $T_1$ at the maximum current density $I_U$ and the time period $T_2$ at the minimum current density $I_L$ are set to appropriate values, to thereby obtain the lower chrome layer $S_1$ (FIG. 1) having a predetermined compressive residual stress and a predetermined crystal grain size.

Figure 3:
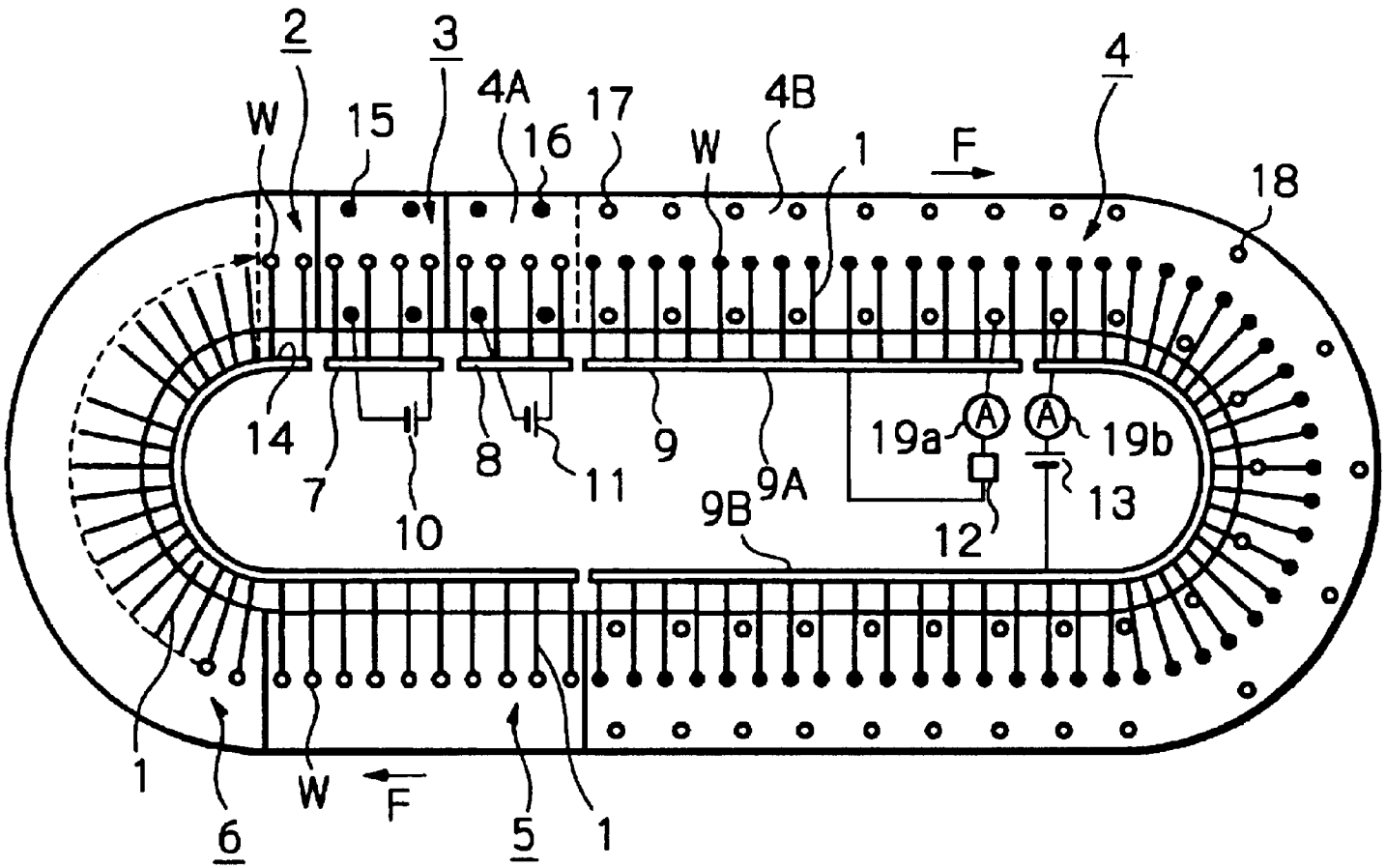
FIG. 3 is a top view schematically showing a structure of a plating apparatus used in the method of the present invention.

FIG. 3 shows an example of an apparatus for obtaining a chrome plated part having the above-mentioned two chrome layers $S_1$ and $S_2$. In FIG. 3, works (such as piston rods) W are suspended from endlessly movable hangers 1. A mounting station 2, an alkali electrolytic degreasing tank 3, a plating tank 4, a cleaning tank 5 and a removing station 6 are arranged in this order below a line of movement of the hangers 1. The plating tank 4 comprises an etching process tank 4A disposed adjacent to the alkali electrolytic degreasing tank 3 and a plating process tank 4B adjacent to the etching process tank 4A. The plating process tank 4B contains the above-mentioned chrome plating bath containing organic sulfonic acid.

Separate bus bars 7, 8 and 9 are arranged along the alkali electrolytic degreasing tank 3, the etching process tank 4A and the plating process tank 4B, respectively. The bus bar 9 extending along the plating process tank 4B comprises a front bus bar 9A on a side of the etching process tank 4A and a rear bus bar 9B on a side of the cleaning tank 5. The bus bar 7 corresponding to the alkali electrolytic degreasing tank 3, the bus bar 8 corresponding to the etching process tank 4A and the rear bus bar 9B corresponding to the plating process tank 4B are connected to direct current sources 10, 11 and 13, respectively. The front bus bar 9A corresponding to the plating process tank 4B is connected to a pulse current source 12.

The hangers 1 have feeding brushes 14. The feeding brushes 14 are brought into sliding contact with the bus bars 7, 8, 9A and 9B, so that a current is equally applied from the current sources 10, 11, 12 and 13 to each of the hangers 1. In each of the alkali electrolytic degreasing tank 3 and the etching process tank 4A, a plurality of cathodes connected in parallel are provided. The cathodes in the alkali electrolytic degreasing tank 3 and the cathodes in the etching process tank 4A are designated by reference numerals 15 and 16, respectively. The plating process tank 4B contains a plurality of anodes 17 corresponding to the front bus bar 9A, which are connected in parallel, and a plurality of anodes 18 corresponding to the rear bus bar 9B, which are also connected in parallel. The current sources 10 and 11 apply currents to the corresponding cathodes 15 and 16, and the current sources 12 and 13 apply currents to the corresponding anodes 17 and 18. In the plating process tank 4B, ammeters 19a and 19b are provided between the anode 17 and the current source 12 and between the anode 18 and the current source 13, respectively.

In order to conduct a chrome plating process using the above-mentioned apparatus, the works W are mounted on the hangers 1 in the mounting station 2. The works W are moved successively to the alkali electrolytic degreasing tank 3 and the etching process tank 4A while being suspended from the hangers 1. In the alkali electrolytic degreasing tank 3, a degreasing process is conducted while making the works W anode. In the etching process tank 4A, an etching process is conducted while making the works W anode. Subsequently, the works W are moved to the plating process tank 4B, where a chrome plating process is conducted while making the works W cathode.

In the chrome plating process, a current having a pulse waveform, such as that indicated in the zone A of FIG. 2, is applied from the current source 12 to the works W through the front bus bar 9A and the anodes 17, to thereby conduct pulse plating. Pulse plating is continued while the feeding brushes 14 of the hangers 1 (from which the works W are suspended) are in contact with the front bus bar 9A. Consequently, the crack-free lower chrome layer $S_1$ (FIG. 1) is formed on a surface of each work W. Subsequently, the feeding brushes 14 of the hangers 1 (from which the works W are suspended) move onto the rear bus bar 9B, and general-purpose plating is conducted by application of a direct current from the current source 13 to the works W through the rear bus bar 9B and the anodes 18. General-purpose plating is continued while the feeding brushes 14 of the hangers 1 (from which the works W are suspended) are in contact with the rear bus bar 9B. Consequently, the multicracked chrome layer $S_2$ having the cracks F is formed on the lower chrome layer $S_1$ in a superimposed manner as shown in FIG. 1. Thereafter, the works W are cleaned with water in the cleaning tank 5 and moved to the removing station 6, where the works W are removed from the hangers 1.

In the above-mentioned chrome plating process, the two chrome layers $S_1$ and $S_2$ can be formed by continuously moving the works W in the same chrome plating bath. Therefore, chrome plated parts having excellent corrosion resistance and heat resistance can be produced efficiently.

In the above-mentioned embodiment, hard chrome plating is conducted in two steps so as to form the two chrome layers $S_1$ and $S_2$. However, in the present invention, the upper chrome layer $S_2$ may be omitted and only the chrome layer $S_1$ may be formed on the work W. In this case, the crack-free chrome layer $S_1$ is exposed to the outside and there is no oil sump for holding lubricating oil as in the case of the upper chrome layer $S_2$ being formed on the lower chrome layer $S_1$. However, the chrome layer $S_1$ is satisfactory in terms of corrosion resistance.

Further, in the first embodiment, the lower chrome layer $S_1$ and the upper chrome layer $S_2$ are formed by continuous operation using the apparatus shown in FIG. 3. However, in the present invention, a single plating tank containing a chrome plating bath may be prepared and the lower chrome layer $S_1$ and the upper chrome layer $S_2$ may be formed by batchwise operation using this plating tank. In this case, an output of a current source is controlled by means of a controller so that a desired current density pattern of an applied current, such as that shown in FIG. 2, can be obtained.

For batchwise operation, instead of using a single plating tank, a plating tank for forming the lower chrome layer $S_1$ and a plating tank for forming the upper chrome layer $S_2$ may be separately provided, and the lower chrome layer $S_1$ and the upper chrome layer $S_2$ may be formed by applying a pulse current to the plating tank for forming the lower chrome layer $S_1$ and applying a direct current to the plating tank for forming the upper chrome layer $S_2$.

Figure 4:
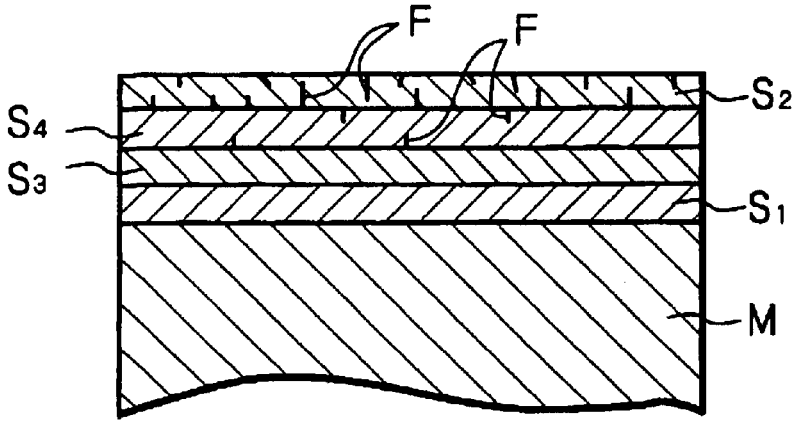
FIG. 4 is a schematic illustration showing a surface structure of a chrome plated part according to a second embodiment of the present invention.

FIG. 4 shows a chrome plated part according to a second embodiment of the present invention. A feature of this embodiment resides in that two intermediate chrome layers $S_3$ and $S_4$ are provided between the lower chrome layer $S_1$ and the upper chrome layer $S_2$. The properties of the intermediate chrome layers $S_3$ and $S_4$ are not particularly limited. However, it is preferred that the intermediate chrome layer $S_3$ on a side of the lower chrome layer $S_1$ has properties similar to those of the lower chrome layer $S_1$ and the intermediate chrome layer $S_4$ on a side of the upper chrome layer $S_2$ has properties similar to those of the upper chrome layer $S_2$. Therefore, a few cracks F may be present in the intermediate chrome layer $S_4$.

By providing the intermediate chrome layers $S_3$ and $S_4$ between the lower chrome layer $S_1$ and the upper chrome layer $S_2$, direct propagation of cracks from the upper chrome layer $S_2$ to the lower chrome layer $S_1$ can be suppressed, so that corrosion resistance of the chrome plated part can be stably maintained. Although the two intermediate layers $S_3$ and $S_4$ are provided in this embodiment, the number of intermediate chrome layers is not specifically limited in the present invention. A single intermediate layer or three or more intermediate layers may be provided.

Figure 5:
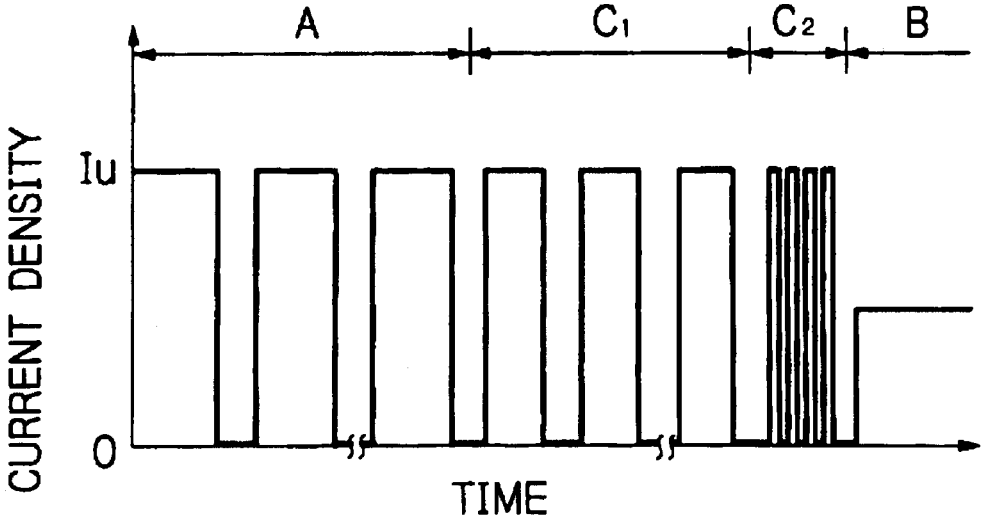
FIG. 5 is a graph showing an example of a waveform of a pulse current in a chrome plating process for obtaining the chrome plated part of FIG. 4.

A chrome plated part in the second embodiment of the present invention can be obtained by, for example, setting zones $C_1$ and $C_2$ between the above-mentioned zones A and B (FIG. 2) as shown in FIG. 5 and setting a waveform of a pulse current in the zones $C_1$ and $C_2$ to the pattern different from that in the zone A. With respect to an apparatus for obtaining the chrome plated part in the second embodiment, substantially the same apparatus as the apparatus of FIG. 3 can be used, except that the front bus bar 9A (FIG. 3) corresponding to the plating process tank 4B is divided into a plurality of bus bars which are connected to different pulse current sources 12.

Figure 6:
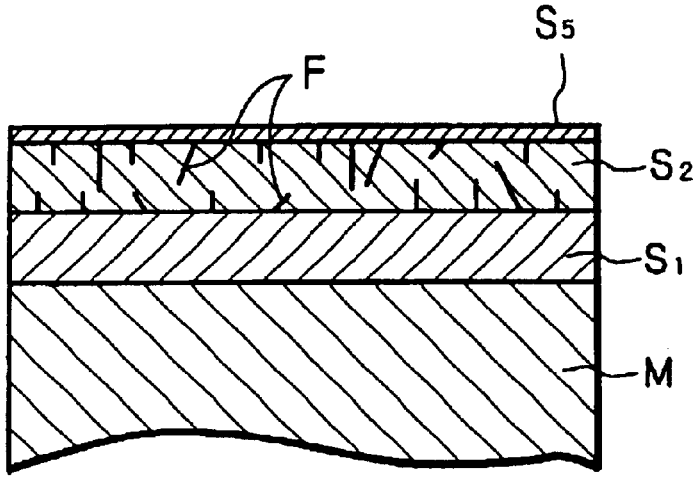
FIG. 6 is a schematic illustration showing a surface structure of a chrome plated part according to a third embodiment of the present invention.

FIG. 6 is a chrome plated part according to a third embodiment of the present invention. A feature of this embodiment resides in that an oxide film $S_5$ containing $Cr_2O_3$ as a main component is formed as an outermost layer of the chrome plated part. The oxide film $S_5$ is formed by conducting a heat oxidation process after polishing (buffing) of the upper chrome layer $S_2$. Due to the presence of the oxide film $S_5$ as the outermost layer of the chrome plated part, corrosion resistance of the upper chrome layer $S_2$ itself can be improved, to thereby prevent formation of white rust which is caused by corrosion of the chrome layer.

In the present invention, the oxide film may be formed solely from $Cr_2O_3$. Needless to say, when the oxide film contains not only $Cr_2O_3$, but also a component other than $Cr_2O_3$ in a small amount, the oxide film is still satisfactory in terms of strength.

Figure 7:
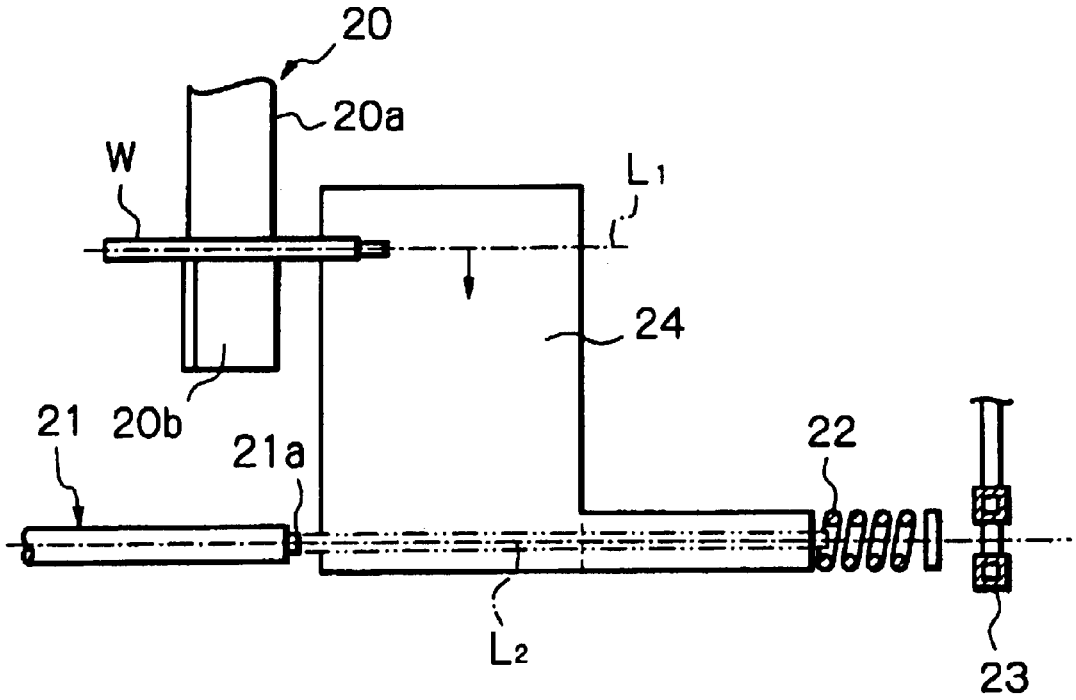
FIG. 7 is a top view schematically showing a structure of a system including polishing and heating apparatuses for obtaining the chrome plated part of FIG. 6.

In order to conduct polishing and heat oxidation, an apparatus such as shown in FIG. 7 can be employed. This apparatus comprises a primary line $L_1$ of production; a centerless polishing disk apparatus 20 provided in the primary line $L_1$; a secondary line $L_2$ of production provided in parallel to the primary line $L_1$; a pusher 21, a high-frequency coil 22 and a cooling coil 23 provided in the secondary line $L_2$; and an inclined stand-by member 24 connected to the primary line $L_1$ and the secondary line $L_2$. The centerless polishing disk apparatus 20 comprises a buff wheel 20a and a regulating wheel 20b. After completion of the chrome plating process, the work W is polished between the buff wheel 20a and the regulating wheel 20b of the centerless polishing disk apparatus 20 and rolls on the inclined stand-by member 24 to the secondary line $L_2$, where the work W is continuously moved through the high-frequency coil 22 and the cooling coil 23 by extension of a rod 21a of the pusher 21. Thus, polishing and heat oxidation can be efficiently conducted.

EXAMPLE 1

Using rods (diameter: 12.5 mm; length: 200 mm) made of steel (JIS S25C) as test pieces, and a chrome plating bath comprising 250 g/L of chromic acid, 2.5 g/L of sulfuric acid, 8 g/L of organic sulfonic acid and 10 g/L of boric acid, pulse plating was conducted under the following conditions: bath temperature=60° C.; maximum current density $I_U$=120 A/dm$^2$; minimum current density $I_L$=0 A/dm$^2$ (the same as in the case of FIG. 2); pulse time (on-time) $T_1$ at maximum current density $I_U$=100 to 800 μs; pulse time (off-time) $T_2$ at minimum current density $I_L$=100 to 500 μs; and frequency= 0.8 to 5.0 kHz. As a result, a crack-free lower chrome layer $S_1$ (FIG. 1) having a thickness of about 3 μm was formed on a surface of each test piece. Subsequently, in the same chrome plating bath, general-purpose plating was conducted at a bath temperature of 60° C. and a current density of 60 A/dm$^2$. As a result, an upper chrome layer $S_2$ (FIG. 1) having a thickness of about 10 μm was formed on the lower chrome layer $S_1$ on each test piece, to thereby obtain samples 2 to 18 (as shown in Table 2). Further, for reference, using the same test piece and chrome plating bath as mentioned above, general-purpose hard chrome plating was conducted at a bath temperature of 60° C. and a current density of 60 A/dm$^2$. As a result, a single chrome layer having a thickness of about 20 μm was formed on a surface of the test piece, to thereby obtain a sample 1.

With respect to the samples 2 to 18, a surface hardness (HV) was measured and visual observation was made by using a microscope to evaluate formation of cracks in each of the lower and upper chrome layers $S_1$ and $S_2$ after deposition. Further, with respect to the lower chrome layer $S_1$, residual stress and crystal grain size were measured as mentioned below. Further, the samples 2 to 18 were subjected to a salt-spray test in accordance with JIS Z2371, and visually observed to evaluate occurrence of rusting. With respect to the samples in which no rusting was observed, they were subjected to heat treatment at 200° C. for 2 hours. The resultant samples were visually observed to evaluate formation of cracks on each of the lower and upper chrome layers $S_1$ and $S_2$ in the above-mentioned manner, and were subjected to the salt-spray test in accordance with JIS Z2371 again to evaluate occurrence of rusting. The color of a surface to each of the samples 2 to 18 was observed at the time of completion of formation of the lower chrome layer $S_1$. The above-mentioned measurements and observations were also conducted with respect to the single chrome layer of the sample 1.

Measurement of residual stress in the chrome layer was conducted by a method called "X-Sen Ouryoku Sokuteihou (X-ray stress measurement method)" disclosed in "Hihakai Kensa (non-destructive inspection)", vol. 37, item 8, pages 636 to 642, edited by The Japanese Society for Non-destructive Inspection. Measurement of a crystal grain size of the chrome layer was conducted using an X-ray diffractometer, by using a characteristic X-ray Cu-Kα (wavelength: 1.5405620 Å) with respect to the Cr (222) diffraction plane. In this measurement, the crystal grain size was determined by assigning the result of measurement of the width (integral width) of a diffraction profile to the following Scherrer's equation. As the integral width, a value corrected by a Cauchy function was used.

$$D_{hkl}=K\cdot\lambda/\beta_1\cos\theta$$

wherein $D_{hkl}$: crystal grain size (Å) [measured in a direction perpendicular to (hkl)]

λ: wavelength of an X-ray for measurement (Å)

$\beta_1$: width (integral width) of a diffraction beam dependent on the crystal grain size (rad)

θ: Bragg angle of the diffraction beam

K: constant (1.05)

Results of the above-mentioned measurements and observations are shown in Table 2.

TABLE 2 (1)

| Sample No. | Pulse time (μs) $T_1$ | Pulse time (μs) $T_2$ | Crystal grain size of $S_1$ (nm) | Cracking of $S_1$ after deposition | Residual stress (MPa) | Hardness (HV) | Appearance of $S_1$ | Rusting: Before heat treatment | Rusting: After heat treatment | Evaluation |
|---|---|---|---|---|---|---|---|---|---|---|
| 1 (Comparative) | | | 6.1 | Observed | +230 | 1,090 | Glossy | Observed (2 h) | | NG |
| 2 (Comparative) | 100 | 100 | 7.8 | Observed | +276 | 1,034 | Glossy | Observed (24 h) | | NG |
| 3 (Comparative) | 200 | 100 | 8.0 | Observed | +160 | 1,017 | Glossy | Observed (24 h) | | NG |
| 4 (Comparative) | 150 | 150 | 8.2 | Observed | +10 | 940 | Glossy | Observed (96 h) | | NG |
| 5 (Comparative) | 200 | 200 | 8.7 | Not observed | −65 | 920 | Glossy | Not observed (300 h) | Observed (24 h) | NG |
| 6 (Present invention) | 150 | 200 | 9.6 | Not observed | −150 | 870 | Glossy | Not observed (300 h) | Not observed (300 h) | OK |
| 7 (Present invention) | 100 | 200 | 9.8 | Not observed | −203 | 835 | Glossy | Not observed (300 h) | Not observed (300 h) | OK |
| 8 (Present invention) | 110 | 220 | 10.1 | Not observed | −220 | 840 | Glossy | Not observed (300 h) | Not observed (300 h) | OK |
| 9 (Present invention) | 800 | 300 | 10.5 | Not observed | −205 | 818 | Glossy | Not observed (300 h) | Not observed (300 h) | OK |
| 10 (Present invention) | 400 | 300 | 10.6 | Not observed | −305 | 782 | Glossy | Not observed (300 h) | Not observed (300 h) | OK |
| 11 (Present invention) | 200 | 300 | 11.1 | Not observed | −339 | 742 | Glossy | Not observed (300 h) | Not observed (300 h) | OK |
| 12 (Present invention) | 300 | 300 | 11.7 | Not observed | −313 | 710 | Glossy | Not observed (300 h) | Not observed (300 h) | OK |
| 13 (Present invention) | 600 | 400 | 12.3 | Not observed | −323 | 681 | Glossy | Not observed (300 h) | Not observed (300 h) | OK |
| 14 (Present invention) | 500 | 400 | 13.5 | Not observed | −334 | 630 | Glossy | Not observed (300 h) | Not observed (300 h) | OK |
| 15 (Present invention) | 400 | 400 | 15.4 | Not observed | −272 | 602 | Glossy | Not observed (300 h) | Not observed (300 h) | OK |
| 16 (Comparative) | 300 | 400 | 16.0 | Observed | +30 | 546 | Milky | Observed (96 h) | | NG |
| 17 (Comparative) | 600 | 500 | 16.7 | Observed | +53 | 498 | Milky | Observed (96 h) | | NG |
| 18 (Comparative) | 700 | 500 | 18.1 | Observed | +18 | 450 | Milky | Observed (96 h) | | NG |

As shown in Table 2, with respect to the sample 1 (comparative) obtained by general-purpose hard chrome plating, the chrome layer contained many cracks and rusting was observed over an entire surface of the chrome layer at an extremely early time (2 hours) in the salt-spray test.

The samples 2 to 18 were obtained by the two-step plating process. Of these, with respect to the samples 2 to 4 and 16 to 18 (comparative), at the time of completion of the plating process, the upper chrome layer $S_2$ contained many cracks and the lower chrome layer $S_1$ was also cracked. When the samples 2 to 4 and 16 to 18 were subjected to the salt-spray test after the plating process, rusting was observed at a relatively early time (24 to 96 hours) in the salt-spray test.

Thus, with respect to the samples 2 to 4 and 16 to 18, rusting occurred in the salt-spray test before heat treatment. Therefore, no heat treatment was conducted with respect to these samples.

On the other hand, with respect to the samples 5 to 15 also obtained by the two-step plating process, at the time of completion of the plating process, the upper chrome layer $S_2$ contained many cracks, but no cracking was observed in the lower chrome layer $S_1$. Further, with respect to the samples 5 to 15, no rusting was observed until 300 hours after the start of the salt-spray test.

With respect to the samples 5 to 15 in which no rusting was observed before heat treatment, they were subjected to heat treatment at 200° C. for 2 hours and visually observed to evaluate formation of cracks and occurrence of rusting. With respect to the sample 5 (comparative), cracking was observed in the lower chrome layer $S_1$ and rusting occurred at a relatively early time (24 hours) in the salt-spray test. On the other hand, with respect to the samples 6 to 15 (present invention), no cracking was observed in the lower chrome layer $S_1$ even after heat treatment and no rusting was observed until 300 hours after the start of the salt-spray test.

Comparison was made between the samples 1 to 18 with respect to residual stress in the lower chrome layer $S_1$ (the single chrome layer in the case of the sample 1). With respect to the samples 1 to 4 and 16 to 18 (comparative), the residual stress was tensile residual stress. With respect to the samples 5 to 15, the residual stress was compressive residual stress. Especially, the samples 6 to 15 (present invention) had a large compressive residual stress of 150 MPa or more.

Further, comparison was made between the samples 1 to 18 with respect to a crystal grain size of the lower chrome layer $S_1$ (the single chrome layer in the case of the sample 1). With respect to the samples 1 to 5 (comparative), the crystal grain size was less than 9 nm. With respect to the samples 6 to 18, the crystal grain size was 9 nm or more. In each of the samples 16 to 18, the chrome layer had an especially large crystal grain size of 16 nm or more.

With respect to the surface hardness (HV), the surface hardness of the sample 1 (obtained by general-purpose hard plating) was the highest. With respect to the remaining samples, the larger the crystal grain size, the lower the surface hardness.

Further, comparison was made between the samples 1 to 18 with respect to the color of a surface of the lower chrome layer $S_1$ (with single chrome layer in the case of the sample 1). With respect to the samples 1 to 15, the chrome layer had a glossy surface characteristic of chrome plating. With respect to the samples 16 to 18, the chrome layer had a milky surface.

From the above, it is apparent that formation of cracks in the chrome layer is dependent on the residual stress and the crystal grain size of the chrome layer. In order to ensure a desired corrosion resistance of the chrome plated part by suppressing cracking of the chrome layer even when it is subject to thermal hysteresis, it is necessary to conduct the chrome plating process so that the lower chrome layer $S_1$ having a compressive residual stress of 150 MPa or more, and preferably having a crystal grain size of 9 nm or more can be obtained. The compressive residual stress which can be obtained solely by adjusting the waveform of a pulse current is limited. Therefore, an appropriate waveform of a pulse current must be selected, depending on the intended applications of the chrome plated part. With respect to the crystal grain size, the lower chrome layer of each of the samples 16 to 18, which had a crystal grain size of 16 nm or more, had tensile residual stress. Therefore, it is preferred that the crystal grain size be less than 16 nm.

EXAMPLE 2

Using the same test piece and chrome plating bath as used in Example 1, pulse plating was conducted under the following conditions: bath temperature=60° C.; maximum current density $I_U$=120 A/dm$^2$; minimum current density $I_L$=0 A/dm$^2$; pulse time (on-time) $T_1$ at maximum current density $I_U$=1,400 μs; pulse time (off-time) $T_2$ at minimum current density $I_L$=600 μs; and frequency=500 Hz. As a result, a lower chrome layer $S_1$ (FIG. 4) having a thickness of about 2 μm was formed on a surface of the test piece. Subsequently, in the same chrome plating bath, pulse plating was conducted under the following conditions: bath temperature=60° C.; maximum current density $I_U$=120 A/dm$^2$; minimum current density $I_L$=0 A/dm$^2$; on-time $T_1$=1,400 μs; off-time $T_2$=400 μs; and frequency=625 Hz. As a result, an intermediate chrome layer $S_3$ (FIG. 4) having a thickness of about 2 μm was formed on a surface of the lower chrome layer $S_1$. Subsequently, in the same chrome plating bath, pulse plating was conducted under the following conditions: bath temperature=60° C.; maximum current density $I_U$=120 A/dm$^2$; minimum current density $I_L$=0 A/dm$^2$; on-time $T_1$=200 μs; off-time $T_2$=100 μs; and frequency=3,333 Hz. As a result, an intermediate chrome layer $S_4$ (FIG. 4) having a thickness of about 2 μm was formed on a surface of the intermediate chrome layer $S_3$. Subsequently, in the same chrome plating bath, general-purpose plating was conducted at a bath temperature of 60° C. and a current density of 60 A/dm$^2$. As a result, an upper chrome layer $S_2$ (FIG. 4) having a thickness of about 5 μm was formed on the intermediate chrome layer $S_4$, to thereby obtain a sample.

With respect to the obtained sample, each of the lower chrome layer $S_1$, the intermediate chrome layers $S_3$ and $S_4$ and the upper chrome layer $S_2$ was visually observed by using a microscope to evaluate formation of cracks. Further, by the same methods as mentioned above in Example 1, residual stress and crystal grain size were measured with respect to each of the chrome layers $S_1$ to $S_4$. The sample was subjected to the salt-spray test in accordance with JIS Z2371, and visually observed to evaluate occurrence of rusting. After the salt-spray test, the sample was subjected to heat treatment at 200° C. for 2 hours, and subjected to the salt-spray test in accordance with JIS Z2371 again. The resultant sample was visually observed to evaluate occurrence of rusting. Results of the above-mentioned measurements and observations are shown in Table 3.

TABLE 3

| | Crystal | | | Rusting | |
|---|---|---|---|---|---|
| Chrome layer | Residual stress (MPa) | grain size (nm) | Cracking after deposition | Before heat treatment | After heat treatment |
| $S_1$ | −279 | 12.2 | Not observed | Not observed | Not observed |
| $S_3$ | −163 | 10.7 | Not observed | | |
| $S_4$ | +226 | 8.0 | Slightly observed | | |
| $S_2$ | +300 | 6.6 | Observed | | |

As shown in Table 3, no cracking was observed with respect to the lower chrome layer $S_1$ and the intermediate chrome layer $S_3$. The intermediate chrome layer $S_4$ on a side of the upper chrome layer $S_2$ was slightly cracked and the upper chrome layer $S_2$ contained many cracks. With respect to the residual stress, each of the lower chrome layer $S_1$ and the intermediate chrome layer $S_3$ had compressive residual stress as large as more than 150 MPa. Each of the intermediate chrome layer $S_4$ and the upper chrome layer $S_2$ had tensile residual stress. With respect to the crystal grain size, the crystal grain size of each of the lower chrome layer $S_1$ and the intermediate chrome layer $S_3$ was as large as more than 9 nm. The crystal grain size of each of the intermediate chrome layer $S_4$ and the upper chrome layer $S_2$ was much smaller than 9 nm.

No rusting was observed in the salt-spray test before and after heat treatment. Therefore, it was understood that the sample had sufficient corrosion resistance.

EXAMPLE 3

Using the same test pieces and chrome plating bath as used in Example 1, pulse plating was conducted under the following conditions: bath temperature=60° C.; maximum current density $I_U$=120 A/dm$^2$; minimum current density $I_L$=0 A/dm$^2$; pulse time (on-time) $T_1$ at maximum current density $I_U$=300 μs; pulse time (off-time) $T_2$ at minimum current density $I_L$=300 μs; and frequency: 1.7 kHz. As a result, a crack-free lower chrome layer $S_1$ (FIG. 1) having a thickness of about 3 μm was formed on a surface of each test piece. Subsequently, in the same chrome plating bath, general-purpose plating was conducted at a bath temperature of 60° C. and a current density of 60 A/dm$^2$. As a result, a cracked upper chrome layer $S_2$ (FIG. 1) having a thickness of about 10 μm was formed on the lower chrome layer $S_1$ on each test piece. The upper chrome layer $S_2$ was finished by buffing so as to have a surface roughness Ra of 0.08 μm. As a result, samples 31 and 32 were obtained. The sample 31 was subjected to a general-purpose baking process at 210° C. for 4 hours, to thereby form an oxide film (containing $Cr_2O_3$ as a main component) on the upper chrome layer $S_2$. The sample 32 was subjected to high-frequency heating at a maximum heating temperature of 400° C. for a short period of time (about 10 seconds), to thereby form an oxide film (containing $Cr_2O_3$ as a main component) on the upper chrome layer $S_2$.

For comparison, using the same test piece and chrome plating bath as used in Example 1, pulse plating was conducted under the following conditions: bath temperature=60° C.; maximum current density $I_U$=120 A/dm$^2$; minimum current density $I_L$=0 A/dm$^2$; on-time $T_1$=200 μs; off-time $T_2$=200 μs; and frequency=2.5 kHz. As a result, a crack-free lower chrome layer $S_1$ having a thickness of about 3 μm was formed on a surface of the test piece. Subsequently, in the same chrome plating bath, general-purpose plating was conducted at a bath temperature of 60° C. and a current density of 60 A/dm$^2$. As a result, a cracked upper chrome layer $S_2$ having a thickness of about 10 μm was formed on a surface of the lower chrome layer $S_1$, to thereby obtain a sample 33. The sample 33 was subjected to the above-mentioned buffing and high-frequency heating. Further, for comparison, substantially the same procedure for obtaining the sample 31 was repeated, except that the baking process was conducted before buffing, to thereby obtain a sample 34.

With respect to each of the samples 31 to 34, residual stress and crystal grain size of the lower chrome layer $S_1$ were measured by the same methods as mentioned above in Example 1. The samples 31 to 34 were subjected to the salt-spray test in accordance with JIS Z2371, and visually observed to evaluate formation of red rust and white rust. Results of the above-mentioned measurements and observations are shown in Table 4.

TABLE 4

| Sample No. | Process | Crystal grain size of $S_1$ (nm) | Residual stress of $S_1$ (MPa) | Method of heat oxidation | Rusting: White rust | Rusting: Red rust |
|---|---|---|---|---|---|---|
| 31 | Plating-Polishing-Oxidation | 11.7 | −313 | Baking | Not observed | Not observed |
| 32 | Plating-Polishing-Oxidation | 11.7 | −313 | High-frequency heating | Not observed | Not observed |
| 33 | Plating-Polishing-Oxidation | 8.7 | −65 | High-frequency heating | Not observed | Observed |
| 34 | Plating-Oxidation-Polishing | 8.7 | −65 | Baking | Observed | Not observed |

As shown in Table 4, in each of the samples 31 and 32, the lower chrome layer $S_1$ had sufficiently large compressive residual stress and a sufficiently large crystal grain size. On the other hand, in each of the samples 33 and 34, the lower chrome layer $S_1$ had undesirably low compressive residual stress and an undesirably small crystal grain size.

Figure 8:
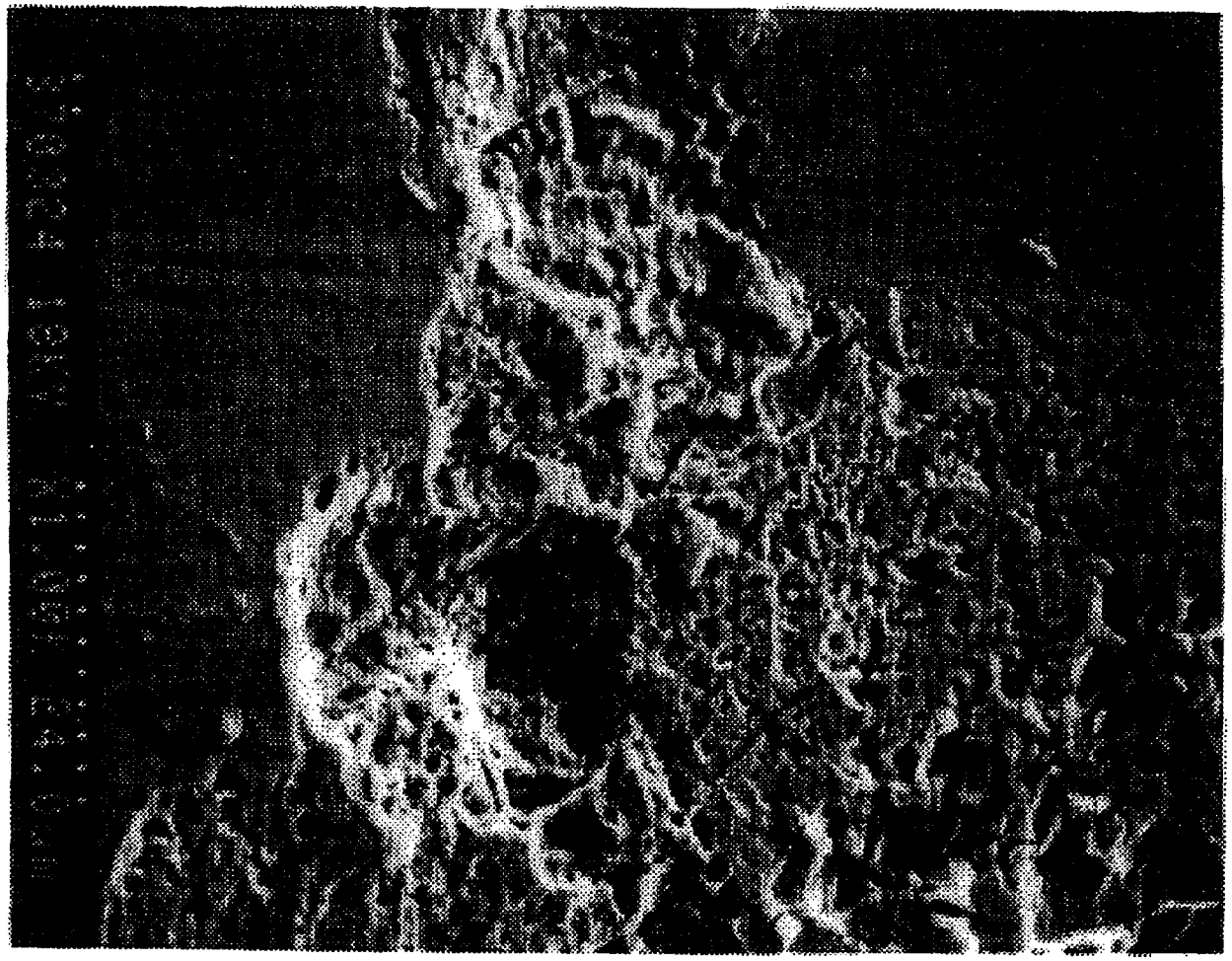
FIG. 8 is a microphotograph showing white rust formed in Examples.

After the salt-spray test, with respect to each of the samples 31 and 32 (present invention), red rust which forms due to corrosion of a metallic substrate and white rust which forms due to corrosion of the chrome layer were not observed. On the other hand, red rust was observed in the sample 33 (comparative) and white rust was observed in the sample 34 (comparative). Red rust was observed in the sample 33 because both of the lower chrome layer $S_1$ and the upper chrome layer $S_2$ contained cracks. White rust was observed in the sample 34 because the oxide film formed by the baking process was removed by buffing. FIG. 8 is a microphotograph showing white rust formed in the sample 34. No red rust was observed in the sample 34 because, during buffing, the cracks were clogged due to the occurrence of plastic flow in the chrome layer.

Figure 9:
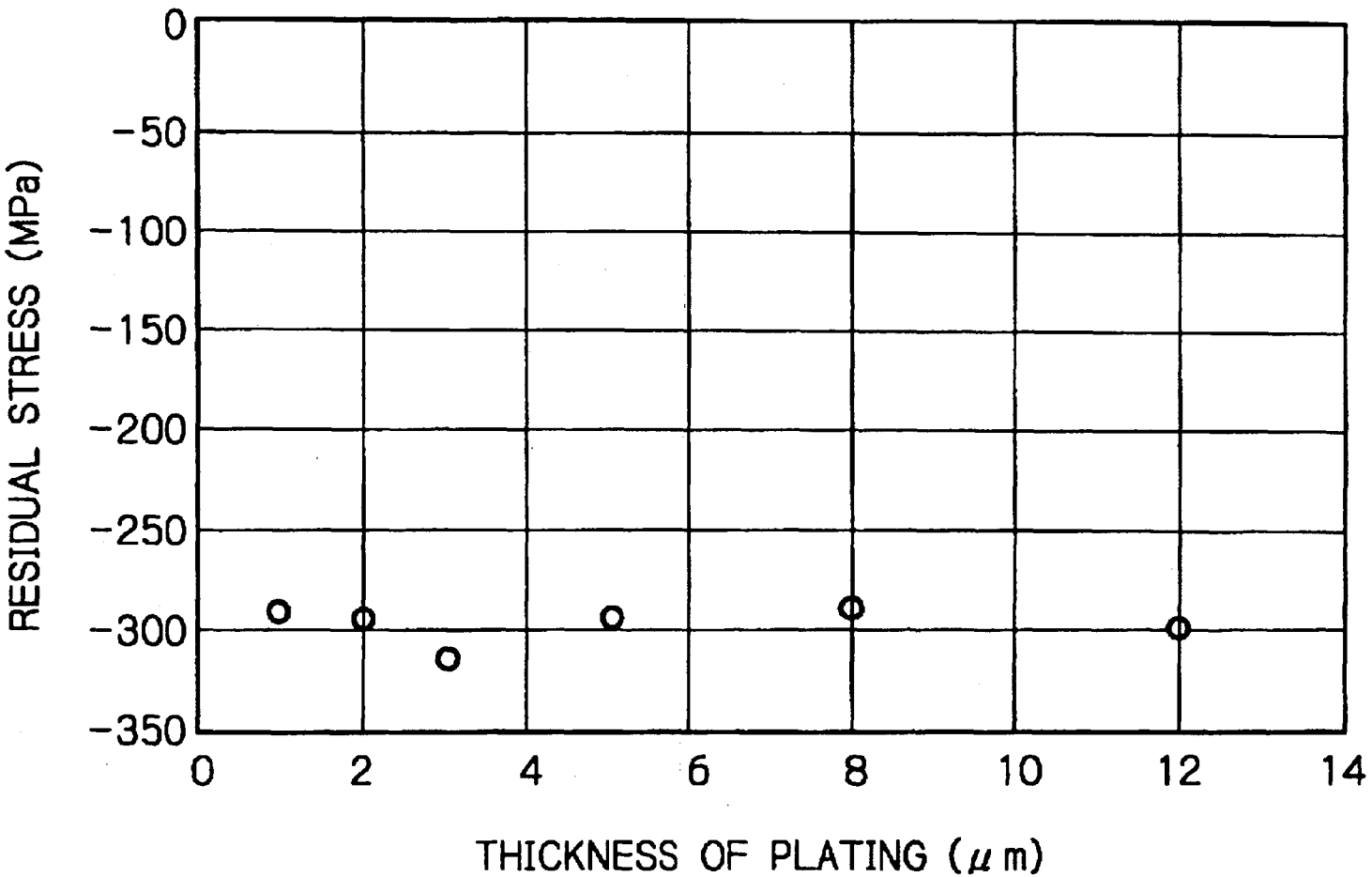
FIG. 9 is a graph showing a relationship between a thickness of plating and residual stress in the chrome plated part of the present invention.

FIG. 9 is a graph showing a relationship between the thickness of plating and residual stress in the chrome plated part of the present invention when pulse plating is conducted by application of the same pulse current as used for obtaining the sample 12. In the graph, there is substantially no stress gradient such as that shown in the above-mentioned Examined Japanese Patent Application Publication No. 43-20082. Average compressive residual stress is stably maintained at a level of 100 MPa or more.

As has been described above, the chrome plated part of the present invention maintains excellent corrosion resistance even when it is subject to thermal hysteresis. Therefore, the present invention is advantageous when applied to products used in corrosive environments and under high temperature conditions. The chrome plated part of the present invention is especially advantageous when it comprises a crack-free chrome layer provided as the lowermost chrome layer and a cracked chrome layer provided as the uppermost chrome layer, because such a chrome plated part has excellent wear resistance and excellent sliding properties.

In the chrome plating method of the present invention, compressive residual stress and crystal grain size of the chrome layer can be easily controlled by adjusting the waveform of a pulse current. Therefore, a chrome plated part having desired properties can be efficiently obtained.

Further, in the method of the present invention for producing a chrome plated part, an oxide film containing $Cr_2O_3$ may be formed as an outermost layer of the chrome plated part. Therefore, formation of red rust due to corrosion of a metallic substrate and formation of white rust due to corrosion of the chrome layer can be surely prevented.

The present invention can be applied to a surface of a piston rod for a shock absorber or a surface of a piton ring for an engine.

The entire disclosures of Japanese Patent Application Nos. 10-332047 and 11-285503 filed on Nov. 6, 1998 and Oct. 6, 1999, respectively, each including a specification, claims, drawings and summary are incorporated herein by reference in their entirety.

What is claimed is:

[1. A chrome plated part comprising a substrate having a crack-free chrome layer on a surface thereof, the crack-free chrome layer having compressive residual stress of 100 MPa or more and being formed by electroplating.]

2. A chrome plated part [according to claim 1]*comprising a substrate having a crack-free chrome layer on a surface thereof, the crack-free chrome layer having compressive residual stress of 100 MPa or more and being formed by electroplating with a pulse current*, wherein the chrome layer has a crystal grain size of 9 nm or more.

3. A chrome plated part according to claim 2, wherein the crystal grain size of the chrome layer is *from 9 nm to* less than 16 nm.

4. A chrome plated part according to [claim 1] *claim 2*, wherein the crack-free chrome layer is a lower chrome layer and the chrome plated part further comprises a cracked upper chrome layer which is formed on the lower chrome layer by electroplating.

5. A chrome plated part according to claim 4, wherein the upper chrome layer has tensile residual stress.

6. A chrome plated part [according to claim 5] *comprising a substrate having a crack-free chrome layer on a surface thereof, the crack-free chrome layer having compressive residual stress of 100 MPa or more and being formed by electroplating with a pulse current*, wherein*:*

*the crack-free chrome layer is a lower chrome layer and the chrome plated part further comprises a cracked upper chrome layer which is formed on the lower chrome layer by electroplating with a pulse current;*

*the upper chrome layer has tensile residual stress; and* the upper chrome layer has a crystal grain and the crystal grain has a size less than 9 nm.

7. A chrome plated part [according to claim 4,] *comprising a substrate having a crack-free chrome layer on a surface thereof, the crack-free chrome layer having compressive residual stress of 100 MPa or more and being formed by electroplating with a pulse current, wherein the crack-free chrome layer is a lower chrome layer and the chrome plated part further comprises a cracked upper chrome layer which is formed on the lower chrome layer by electroplating with a pulse current, the chrome plated part* further comprising at least one intermediate chrome layer which is formed between the lower chrome layer and the upper chrome layer by electroplating.

8. A chrome plated part [according to any one of claims 1, 4 and 7, further comprising] *comprising a substrate having a crack-free chrome layer on a surface thereof, the crack-free chrome layer having compressive residual stress of 100 MPa or more and being formed by electroplating with a pulse current and* an oxide film containing $Cr_2O_3$ as an outermost layer thereof.

[9. A chrome plated part comprising a substrate having a crack-free chrome layer on a surface thereof, the crack-free chrome layer having compressive residual stress of 150 MPa or more and being formed by electroplating.]

10. A chrome plated part [according to claim 9] *comprising a substrate having a crack-free chrome layer on a surface thereof, the crack-free chrome layer having compressive residual stress of 150 MPa or more and being formed by electroplating with a pulse current*, wherein the crack-free chrome layer has a crystal grain size of 9 nm or more.

11. A chrome plated part according to claim 10, wherein the crystal grain size of the crack-free chrome layer is *from 9 nm to* less than 16 nm.

[12. A chrome plated part comprising:

a substrate having a surface; and a chrome layer deposited on the surface of the substrate by electroplating, the chrome layer having compressive residual stress of 100 MPa or more.]

13. A chrome plating method comprising the step of conducting electroplating of a work in a chrome plating bath by application of a pulse current, the chrome plating bath containing organic sulfonic acid, to thereby deposit a crack-free chrome layer on a surface of the work, the crack-free chrome layer having compressive residual stress of 150 MPa or more.

14. A chrome plating method comprising the step of conducting electroplating of a work in a chrome plating bath by application of a pulse current, the chrome plating bath containing organic sulfonic acid, to thereby deposit a crack-free chrome layer on a surface of the work, the crack-free chrome layer having compressive residual stress of 100 MPa or more.

15. A chrome plating method according to claim 14 or 13, wherein the crack-free chrome layer is formed to have a crystal grain size of from 9 nm to less than 16 nm by adjusting a waveform of the pulse current.

16. A method for producing a chrome plated part, comprising the steps of:

conducting the chrome plating method of claim 14;

polishing the crack-free chrome layer on the surface of the work; and conducting heat oxidation, to thereby form an oxide film containing $Cr_2O_3$ on a surface of the crack-free chrome layer.

17. A method according to claim 16, wherein the heat oxidation is conducted under the same conditions as conditions of a baking process.

18. A method according to claim 16, wherein the heat oxidation is conducted by high-frequency heating.

19. A chrome plating method according to claim 14, further comprising the step of conducting, after the pulse plating, electroplating of the work in the same chrome plating bath as the chrome plating bath for the pulse plating, by one of adjustment of a waveform of the pulse current and application of a direct current, to thereby deposit a cracked upper chrome layer on the crack-free chrome layer.

20. A chrome plating method according to claim 14, further comprising the steps of:

conducting, after the pulse plating, electroplating of the work in the same chrome plating bath as the chrome plating bath for the pulse plating, by one of adjustment of a waveform of the pulse current and application of a direct current, to thereby deposit an intermediate chrome layer on the crack-free chrome layer; and conducting electroplating of the work in the same chrome plating bath as the chrome plating bath for the pulse plating, by one of adjustment of the waveform of the pulse current and application of the direct current, to thereby deposit a cracked upper chrome layer on the intermediate chrome layer.

21. A chrome plating method according to claim 19 or 20, wherein the chrome layers are deposited by continuous operation by continuously moving the work in the chrome plating bath.

22. A chrome plating method according to claim 19 or 20, wherein the chrome layers are deposited by batchwise operation by immersing the work in the chrome plating bath.

23. A method for producing a chrome plated part, comprising the steps of:

conducting the chrome plating method of claim 19 or 20;

polishing the upper chrome layer formed on the crack-free chrome layer on the surface of the work; and conducting heat oxidation, to thereby form an oxide film containing $Cr_2O_3$ on a surface of the upper chrome layer.

24. A method according to claim 23, wherein the heat oxidation is conducted under the same conditions as conditions of a baking process.

25. A method according to claim 23, wherein the heat oxidation is conducted by high-frequency heating.

[26. A chrome plating method comprising the steps of:

providing a substrate having a surface; and depositing a chrome layer on the surface of the substrate by electroplating so that the chrome layer has compressive residual stress of 100 MPa or more.]

*27. The method according to claim 17, wherein said baking process is at 191±14° for 3 hours or more.*

*28. A method of chrome plating comprising the steps of:*

*providing a substrate having a surface;*

*depositing a crack-free chrome layer on the surface of the substrate by electroplating by application of a pulse current so that the crack-free chrome layer has compressive residual stress of 100 MPa or more, wherein said electroplating is in the presence of an organic sulfonic acid, and*

*forming an oxide film containing $Cr_2O_3$ on the surface of the crack-free chrome layer as an outermost layer.*

*29. A chrome plated part according to claim 7, further comprising an oxide film containing $Cr_2O_3$ as an outermost layer thereof.*

*30. A chrome plated part comprising a substrate having a crack-free chrome layer on a surface thereof, the crack-free chrome layer having a compressive residual stress of 100 MPa or more and being formed by electroplating with a pulse current, wherein:*

*the crack-free chrome layer is a lower chrome layer and the chrome plated part further comprises a cracked upper chrome layer which is formed on the lower chrome layer by electroplating with a pulse current; and*

*the chrome plated part further comprises an oxide film containing $Cr_2O_3$ as an outermost layer thereof.*

* * * * *